The United States of America.

*To all to whom thefe Letters Patent fhall come:*

WHEREAS *Samuel Morey* a citizen of the State of *New Hampshire* in the United States, hath alledged that he has invented a new and ufeful improvement *upon his own invented water engine*, which improvement has not been known or ufed before his application; has *made oath* that he does verily believe that he is the true inventor or difcoverer of the faid improvement; has paid into the Treafury of the United States, the fum of thirty dollars, delivered a receipt for the fame, and prefented a petition to the Secretary of State, fignifying a defire of obtaining an exclufive property in the faid improvement, and praying that a patent may be granted for that purpofe: THESE ARE THEREFORE to grant, according to law, to the faid *Samuel Morey*, his heirs, adminiftrators, or affigns, for the term of fourteen years, from the *Twenty fourth* day of *of the present month of April* the full and exclufive right and liberty of making, conftructing, ufing, and vending to others to be ufed, the faid improvement, a defcription whereof is given in the words of the faid *Samuel Morey* [illegible] himfelf, in the fchedule hereto annexed, and is made a part of thefe prefents.

IN TESTIMONY WHEREOF, *I have caufed thefe Letters to be made Patent, and the Seal of the United States to be hereunto affixed.*

*GIVEN under my hand, at the City of Philadelphia this Twenty fourth day of April in the Year of our Lord, one thoufand feven hundred* [illegible] *and of the Independence of the United States of America, the* [illegible]

*John Adams*

By the PRESIDENT,

*Timothy Pickering* *Secretary of State.*

*City of Philadelphia* —To wit:

I DO HEREBY CERTIFY, That the foregoing Letters Patent, were delivered to me on the *[illegible]* day of *April* in the year of our Lord one thoufand feven hundred *[illegible]* to be examined; that I have examined the fame, and find them conformable to law. And I do hereby return the fame to the Secretary of State, within fifteen days from the date aforefaid, to wit: On this *[illegible]* day of *April* in the year aforefaid.

*Charles Lee*
*Atty General*

The Schedule [illegible] to in these Letters Patent and making part of the same containing a description in the words of the said Samuel Morey himself of his improvement upon his new invented [illegible] Engine.

Description or specification of Samuel Morey's improvement to his new invented [illegible] engine [illegible] it consists of a pipe to lead the steam from the top of the boiler, that will extend far enough to condense the same placed in such a form, that the condensed steam shall return back into the boiler, a valve in the outer end of the pipe will prevent the air or water from passing into the boiler, while there is a Vacuum in the same, and let the steam out while there is none. After the water has boiled a sufficient time to have driven the air out through the pipe the valve is to be shut, and the box or tube that incloses the pipe is to be filled and kept supplied with cold water, this will make the [illegible] a vacuum in the boiler the water will then boil with less heat, the steam will then occupy a much larger space in the [illegible] and consequently increase the power of the Engine [illegible]. In some cases it may be best to make use of Ether or spirits of [illegible] instead of water, as they boil with a less degree of heat.

Witnesses,
Wm. [illegible]
[illegible]

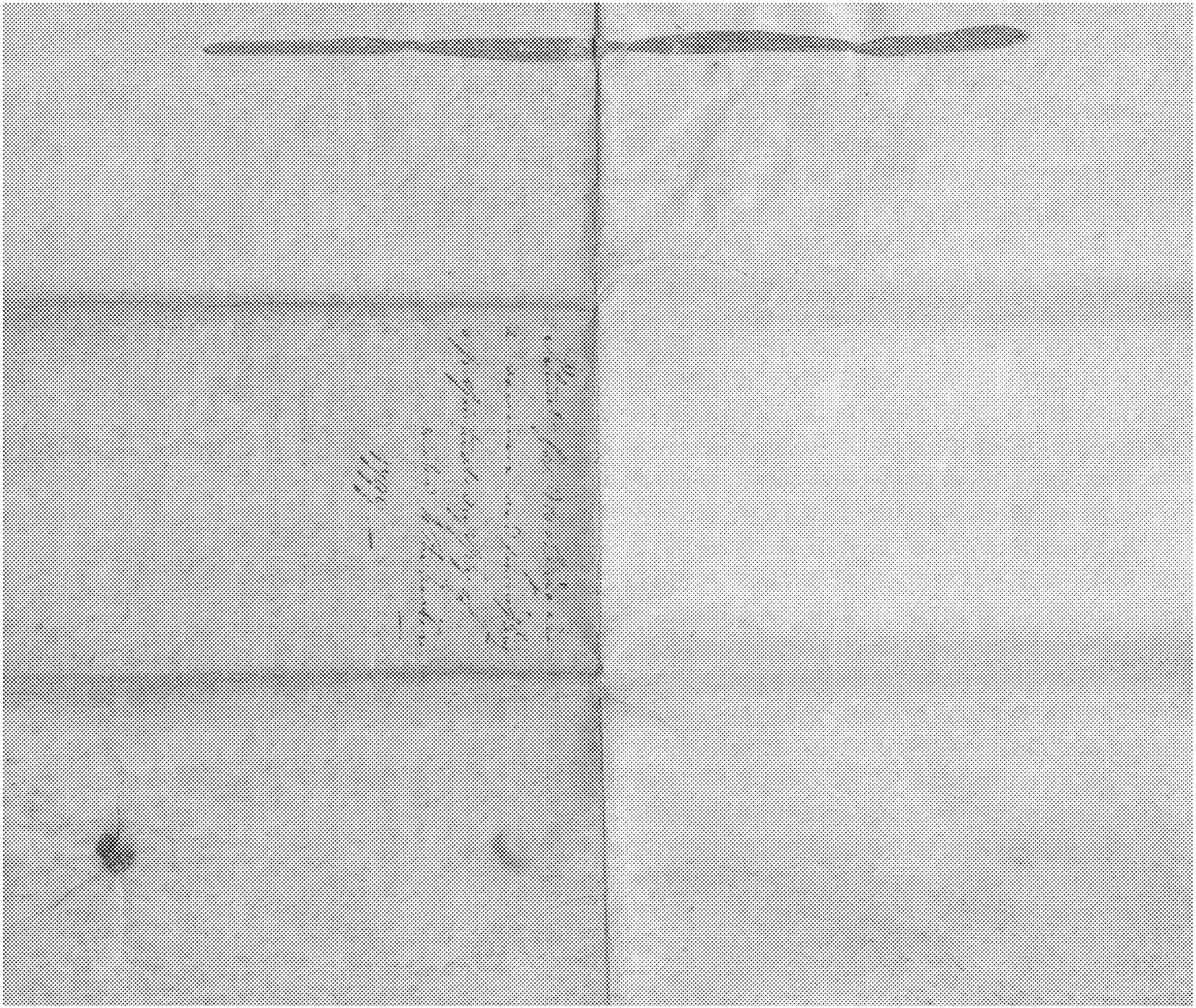

Samuel Morey